United States Patent
Boeckmann et al.

(10) Patent No.: US 10,329,401 B2
(45) Date of Patent: Jun. 25, 2019

(54) DEEP BLACK THERMOPLASTIC MOLDING COMPOSITIONS HAVING HIGH GLOSS AND PRODUCTION THEREOF

(71) Applicant: INEOS STYROLUTION GROUP GMBH, Frankfurt (DE)

(72) Inventors: Philipp Boeckmann, Bad Duerkheim (DE); Norbert Mosbach, Maxdorf (DE); Eike Jahnke, Frankfurt (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 155 days.

(21) Appl. No.: 15/021,412

(22) PCT Filed: Sep. 12, 2014

(86) PCT No.: PCT/EP2014/069473
§ 371 (c)(1),
(2) Date: Mar. 11, 2016

(87) PCT Pub. No.: WO2015/036526
PCT Pub. Date: Mar. 19, 2015

(65) Prior Publication Data
US 2016/0222185 A1    Aug. 4, 2016

(30) Foreign Application Priority Data
Sep. 16, 2013 (EP) .................................... 13184569

(51) Int. Cl.
*C08K 3/04* (2006.01)
*C08K 5/00* (2006.01)
*C08L 33/10* (2006.01)
*C08L 69/00* (2006.01)
*C08L 33/12* (2006.01)
*C08L 25/04* (2006.01)
*C08K 3/013* (2018.01)
*C08L 25/12* (2006.01)

(52) U.S. Cl.
CPC ................ *C08K 3/04* (2013.01); *C08K 3/013* (2018.01); *C08K 5/0041* (2013.01); *C08L 25/04* (2013.01); *C08L 33/10* (2013.01); *C08L 33/12* (2013.01); *C08L 69/00* (2013.01); *C08L 25/12* (2013.01)

(58) Field of Classification Search
CPC ...... C08K 3/04; C08K 3/0033; C08K 5/0041; C08L 33/12; C08L 69/00; C08L 33/10; C08L 25/12
See application file for complete search history.

(56) References Cited

U.S. PATENT DOCUMENTS

| | | |
|---|---|---|
| 5,576,377 A | 11/1996 | El Sayed et al. |
| 7,077,898 B2 | 7/2006 | Babler |
| 2005/0014863 A1 | 1/2005 | Babler |
| 2008/0103267 A1 | 5/2008 | Hurst et al. |
| 2008/0306204 A1 | 12/2008 | Ermi et al. |
| 2014/0275368 A1* | 9/2014 | He .......................... C08L 69/00 524/151 |

FOREIGN PATENT DOCUMENTS

| | | |
|---|---|---|
| DE | 4411067 A1 | 10/1995 |
| EP | 1685192 A1 | 8/2006 |
| WO | 2005049727 A1 | 6/2005 |

OTHER PUBLICATIONS

Flick, Plastic Additives; An Industrial Guide, 3rd Ed., vol. II, p. 75 (2002).*
English translation of International Preliminary Report on Patentability in corresponding International Application No. PCT/EP2014/069473, (dated Aug. 17, 2015).

* cited by examiner

*Primary Examiner* — Jessica M Roswell
(74) *Attorney, Agent, or Firm* — J.A. Lindeman & Co. PLLC; Aaron Raphael; Jeffrey Lindeman

(57) ABSTRACT

Deep black thermoplastic molding compositions having high gloss can be produced by mixing the following components: 90% to 99.5% by weight of one or more styrene copolymers as component A1, or 90% to 99.5% by weight of one or more polymethylmethacrylates (PMMA) and/or polyalkylmethacrylates as component A2, or 90% to 99.5% by weight of one or more polycarbonates (PC) and/or polyester carbonates as component A3, 0.01% to 5% by weight of a pigment black as component B, 0.1% to 1.5% by weight of at least two dyes soluble in the molding composition as component C, 0% to 5% by weight of one or more additives other than components B and C, as component D. These are found to be particularly weathering-resistant.

11 Claims, No Drawings

DEEP BLACK THERMOPLASTIC MOLDING COMPOSITIONS HAVING HIGH GLOSS AND PRODUCTION THEREOF

The invention relates to the production and use of deep-black-colored polymeric molding compositions. By using a plurality of components it is possible to achieve an optimized deep gloss for amorphous and semicrystalline, transparent thermoplastic compositions.

The coloring of various thermoplastics is described in the prior art, but the production of deep-black molding compositions has hitherto been problematic. EP-A 1685192 discloses a polymer composition used for laser inscription and comprising a rubber latex, and also a black pigment and a dye. US 2005/0014863 and U.S. Pat. No. 7,077,898 disclose pigment-containing polymer compositions comprising "carbon black" and another pigment described via a general formula.

Black colors are often produced in molding compositions by using carbon black pigment ("pigment black"). Quantities of carbon black from 0.1% to 5% are proposed for black coloring of polymers, but it is not possible to achieve deep black. The perceived color of the polymers colored by this method is merely a standard black with L*-values from 3.0 to 10.0 (measured in accordance with DIN 5033, Measurement method for color measurement (e.g. 2009); diffuse/8 degrees, excluding gloss) with a low gloss level of less than 97 for measurement angles of 20/60/85 degrees.

It is an object of the present invention to provide thermoplastic molding compositions which have a deep-black color such that the perceived color can be black even when the moldings are thin. The molding compositions are secondly also intended to provide high gloss to the moldings, said gloss also being retained after weathering (inter alia heat and moisture).

Various thermoplastic copolymers can be used as main polymer, component A, of the composition (molding composition). These polymers are preferably transparent and, together with this, can be either amorphous, examples being styrene polymers (e.g. SAN), polystyrene (PS), polymethyl methacrylates (PMMA), polyalkyl methacrylates, polycarbonates, polyester carbonates) or semicrystalline (transparent polypropylene, PP).

It is possible in the invention to produce various colorings which have very high blackness ("deep black") or a very low L*-value in accordance with DIN 5033. The expression deep black here describes compositions which have an L*-value of from 0.4 to 2 in accordance with DIN 5033. The molding compositions of the invention can often have an L*-value as low as from 0.4 to 1, in particular from 0.4 to 0.9.

The expression transparent polymers means polymers which exhibit a maximal haze value of 25% at a layer thickness of 2 mm in accordance with DIN 14782 (Technical Building Regulations).

The gloss value of the products produced from the thermoplastic molding compositions is important for practical applications and can by way of example be determined by way of the gloss value measured in accordance with DIN 67530 (Reflectometer determination, 1982). Another important factor for industry is very good processability in the molding compositions of the invention by injection molding. The molding compositions are therefore intended to have good flow properties during injection, high stability during cooling and demolding, and also good resistance to environmental effects.

The prior art also reveals no process for producing deep-black molding compositions with high gloss and good processability. The moldings produced therefrom are also intended to be weathering-resistant, i.e. not to lose gloss and deep-black color even after prolonged exposure to UV radiation, moisture, and relatively high temperature.

The present invention therefore provides black thermoplastic molding compositions with high gloss, comprising (or consisting of):
   a) from 90 to 99.5% by weight of one or more styrene copolymers as component A1, or
      from 90 to 99.5% by weight of one or more polymethyl methacrylates (PMMA) and/or polyalkyl methacrylates as component A2, or
      from 90 to 99.5% by weight of one or more polycarbonates (PC) and/or polyester carbonates as component A3,
   b) from 0.01 to 5% by weight of a carbon black pigment as component B,
   c) as component C, from 0.1 to 1.5% by weight of at least two dyes soluble in the molding composition,
   d) as component D, from 0 to 5% by weight of one or more additional substances different from components B and C,
where each of the percentages by weight is based on the total weight of components A to D, and these give a total of 100 percent by weight.

The invention in particular provides deep-black thermoplastic molding compositions with high gloss comprising (or consisting of):
   from 90 to 99.5% by weight of one or more styrene copolymers as component A1,
   from 0.01 to 5% by weight of a carbon black pigment as component B, as component C, from 0.1 to 1.5% by weight of at least two dyes soluble in the molding composition,
   as component D, from 0 to 5% by weight, in particular from 0.1 to 5% by weight, of one or more additional substances different from components B and C,
where each of the percentages by weight is based on the total weight of components A to D, and these give a total of 100 percent by weight.

The invention also provides thermoplastic molding compositions in which component C comprises at least three different dyes which cover complementary color regions.

The invention also provides thermoplastic molding compositions in which the molding composition comprises, as component B, from 0.01 to 5% by weight of a carbon black pigment which has an average primary particle size in the range from 5 to 100 nm, preferably 7 to 60 nm.

The invention also provides thermoplastic molding compositions in which component A used comprises a copolymer of acrylonitrile, styrene, and/or α-methylstyrene, phenylmaleimide, maleic anhydride, methyl methacrylate, or a mixture of these. In particular A1 is a copolymer of acrylonitrile, styrene, and/or α-methylstyrene, for example SAN or AMSAN.

The invention also provides thermoplastic molding compositions in which component C comprises at least three different dyes which cover complementary color regions. The invention also provides thermoplastic molding compositions in which the molding composition comprises, as component B, from 0.01 to 5% by weight of a carbon black pigment which has an average primary particle size in the range from 5 to 100 nm, preferably 7 to 60 nm.

The invention also provides thermoplastic molding compositions in which component A used comprises a copolymer of acrylonitrile, styrene, and/or α-methylstyrene, and the proportion by weight of acrylonitrile, based on component A, is from 19 to 39% by weight.

The invention also provides thermoplastic molding compositions in which component A used comprises a styrene/acrylonitrile copolymer or an α-methylstyrene/acrylonitrile copolymer.

The invention also provides thermoplastic molding compositions in which component A used comprises a transparent styrene/acrylonitrile copolymer or a transparent α-methylstyrene/acrylonitrile copolymer with a melt volume rate (MVR, 220/3.8) of from 4 to 22 cm$^3$/10 min.

The invention also provides thermoplastic molding compositions in which component A used comprises a styrene/methyl methacrylate copolymer, where the proportion by weight of MMA, based on component A, is from 19 to 31% by weight.

The invention also provides thermoplastic molding compositions in which component A used comprises a transparent PMMA with a melt volume rate (MVR, 230/3.8) of from 2 to 15 cm$^3$/10 min.

The invention also provides thermoplastic molding compositions in which component A used comprises a transparent polycarbonate (PC) and/or polyester carbonate with a melt volume rate (MVR, 300/1.2) of from 4 to 35 cm$^3$/10 min.

The invention also provides thermoplastic molding compositions in which the proportion by weight of B is from 0.05 to 3% by weight.

The invention also provides thermoplastic molding compositions in which the proportion by weight of C is from 0.5 to 1.2% by weight.

The invention also provides thermoplastic molding compositions, the perceived color thereof being deep black with L*-values from 0.5 to 2.0.

The invention also provides thermoplastic molding compositions in which the ratio by weight of component B used to component C used is from 3:1 to 1:15.

The invention also provides the use of the thermoplastic molding compositions mentioned for the production of moldings with deep-black surface and high gloss for the use in motor vehicles, household appliances, electrical equipment, decorative strips, and outdoor cladding. The invention also provides the use of the thermoplastic molding compositions in the external region of motor vehicles, e.g. A-, B-, C-, or D-pillar cladding, spoilers, window frames, cover strips, hood, and panels, or as part of the radiator grille, of the antenna cladding, of the side mirror, or of the front or rear lamps.

The invention also relates to a process for the production of a thermoplastic molding composition as described above in which components A, B, and C, and also optionally D, are mixed with one another, for example with exposure to heat in an extruder.

In one embodiment of the invention the thermoplastic molding compositions used comprise, as component A1, a copolymer of acrylonitrile, styrene, and/or α-methylstyrene, phenylmaleimide, maleic anhydride, methyl methacrylate, or a mixture of these. In particular A1 is a copolymer of acrylonitrile, styrene, and/or α-methylstyrene. The proportion by weight of acrylonitrile in the copolymer here, based on component A1, is often from 19 to 39% by weight.

Preference is given to a thermoplastic molding composition where a styrene/acrylonitrile copolymer or an α-methylstyrene/acrylonitrile copolymer is used as component A1. Component A used often comprises a transparent styrene/acrylonitrile copolymer or a transparent α-methylstyrene/acrylonitrile copolymer with a melt volume rate (MVR, 220/10) of from 4 to 22 cm$^3$/10 min. The MVR value can be determined in a capillary rheometer in accordance with ISO 1133. An example that may be mentioned is the SAN product Luran® from Styrolution (Frankfurt/Main) (see Luran® HH-120; AMSAN for injection molding).

The invention also provides thermoplastic molding compositions where a styrene/methyl methacrylate copolymer is used as component A1, where the proportion by weight of MMA in the copolymer, based on component A1, is from 19 to 31% by weight.

The invention also provides thermoplastic molding compositions where component A2 used comprises a transparent PMMA with a melt volume rate (MVR, 230/3.8) of from 2 to 15 cm$^3$/10 min. Plexiglas products based on PMMA, e.g. Plexiglas® 8N (from Evonik Industries) are a typical example of this component A2.

The invention also provides thermoplastic molding compositions where component A3 used comprises a transparent polycarbonate (PC) and/or polyester carbonate with a melt volume rate (MVR, 300/1.2) of from 4 to 35 cm$^3$/10 min. Polycarbonates based on, for example, Makrolon® (from Bayer AG) are a typical example of this component A3.

The thermoplastic molding compositions of the invention comprise at least one carbon black pigment as component B. The molding composition here preferably comprises from 0.01 to 5% by weight, based on the entire composition, of a carbon black pigment.

The average primary particle size of this carbon black pigment is preferably in the range from 5 to 100 nm, preferably from 7 to 60 nm. Typical carbon black components for the inventive use have more than 95% by weight carbon content and specific surface area greater than 100 m$^2$/g.

Examples of typical commercially available products are Printex 60, and Printex 90 (Orion Engineered Carbons GmbH).

The invention also provides the abovementioned thermoplastic molding compositions where the proportion by weight of component B is from 0.05 to 3% by weight, often from 01.1 to 2% by weight, based on the entire composition.

The thermoplastic molding compositions of the invention moreover comprise a component C, where the proportion by weight of component C is from 0.1 to 1.5% by weight, preferably from 0.5 to 1.2% by weight. Component C here includes two or more dyes which are soluble in the molding composition. It is preferable that the thermoplastic molding compositions comprise, as component C, at least three different dyes, often three or four, which cover complementary color regions.

The nature of these two, three, or four dyes which often cover complementary color regions is often selected in such a way that the combination produces a black color. Dyes of this type are known to colorists. An example of the simple combination giving a black color is a red dye and its complementary green dye: by way of example the known dye Solvent Red 135 can be used in combination with the known dye Solvent Green 28 to achieve a black coloration.

It is also possible in the invention to use the combination of a blue dye with a complementary yellow dye to produce black color. An example would be the combination of Solvent Blue 97 with Disperse Yellow 54, both of which are known per se.

Combinations of more than two dyes (as component C) are preferred. It is thus possible to avoid undesired shades of the black color or to adjust these in the desired direction. An example of component C is the combination of Solvent Red 135 with Solvent Green 28 and Disperse Yellow 201.

A combination that has proven particularly successful in the invention for component C is the combination of the blue dye Solvent Violet 13 with the yellow dye Solvent Yellow 93 and the violet dye Solvent Violet 59. The respective structures of these anthraquinone and pyrrazole dyes is shown below.

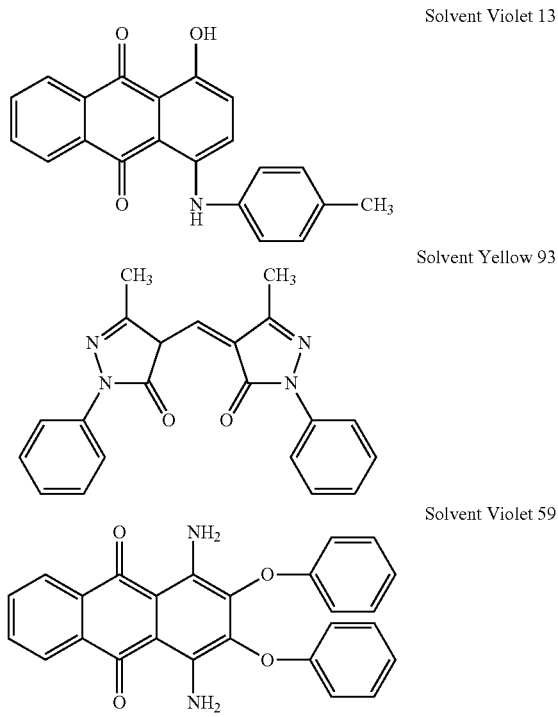

The invention also provides thermoplastic molding compositions where the perceived color of said molding compositions is deep black with L*-values from 0.4 to 2.0%, often from 0.4 to 1.0%. The invention also provides molding compositions with little or no goniochromism. Goniochromism can be avoided by minimizing penetration depth: goniochromism decreases as penetration depth decreases. Penetration depth can be calculated by using known Kubelka-Munk theory for a given color formulation (Paul Kubelka, Franz Munk: Ein Beitrag zur Optik der Farbanstriche [Optics of paints] in: Zeitschrift für technische Physik, 12, 1931, pp. 593-601).

The ratio by weight of component B used to component C used in the thermoplastic molding compositions of the invention is often from 2:1 to 1:20, in particular from 1:1 to 1.15.

The invention also provides the production of the deep-black molding compositions via mixing of the components (e.g. in mixing devices such as extruders), and also the use of the thermoplastic molding compositions for the production of moldings with deep-black surface and high gloss for the use in motor vehicles, household appliances, electrical equipment, decorative strips, and outdoor cladding. The invention also provides the use of the thermoplastic molding compositions in the external region of motor vehicles, e.g. A-, B-, C-, or D-pillar cladding, spoilers, window frames, cover strips, hood, and panels, or as part of the radiator grille, of the antenna cladding, of the side mirror, or of the front or rear lamps.

Re: Component A

A suitable polymer component A in the invention is in principle any of the transparent thermoplastic polymers known to the person skilled in the art and described in the literature, examples being the following as component A1: styrene-acrylonitrile copolymers, α-methylstyrene-acrylonitrile copolymers, styrene-α-methylstyrene-acrylonitrile terpolymers, N-phenylmaleimide-styrene copolymers, N-phenylmaleimide-styrene-acrylonitrile terpolymers, maleic anhydride-styrene copolymers, maleic anhydride-styrene-acrylonitrile terpolymers, and styrene-methyl methacrylate copolymers.

Component A2 used can in particular be commercially available polymethyl methacrylate (PMMA). Suitable components A3 are in particular commercially available, transparent polycarbonates (PC) and polyester carbonates.

In one particular embodiment it is also possible to use blends made of components A1 and/or A2 and/or A3. The total quantity of A1, A2, and A3 in this case is then from 90 to 99.5% by weight of the thermoplastic composition. Typical examples are A1 plus A2 and A1 plus A3. Polystyrene is also in principle suitable as component A.

Preferred polymers A1 are composed of from 50 to 90% by weight, preferably from 60 to 85% by weight, in particular from 65 to 81% by weight, of styrene, and of from 10 to 50% by weight, preferably from 15 to 39% by weight, in particular from 19 to 35% by weight, of acrylonitrile, and also of from 0 to 5% by weight, preferably from 0 to 4% by weight, in particular from 0 to 3% by weight, of other monomers, where the % by weight values are in each case based on the weight of component A1, and give a total of 100% by weight. Intrinsic viscosity is often from 55 to 85 ml/g (IV: measured in 0.5% toluene solution at 20° C.). Molar mass (Mw) is often in the range from 110 000 to 190 000 g/mol. It can be determined by conventional methods for SAN copolymers.

Polymers A1 to which preference is further given are composed of from 50 to 90% by weight, preferably from 61 to 81% by weight, in particular from 65 to 78% by weight, of α-methylstyrene and of from 10 to 50% by weight, preferably from 19 to 39% by weight, in particular from 22 to 35% by weight, of acrylonitrile, and also of from 0 to 5% by weight, preferably from 0 to 4% by weight, in particular from 0 to 3% by weight, of other monomers, where the % by weight values are in each case based on the total weight of A1, and give a total of 100% by weight. Intrinsic viscosity: from 45 to 70 ml/g (IV: measured in 0.5% toluene solution at 20° C.).

Polymers A1 that are likewise preferred are composed of from 50 to 90% by weight, preferably from 60 to 80% by weight, in particular from 65 to 78% by weight, of N-phenylmaleimide and of from 10 to 50% by weight, preferably from 19 to 39% by weight, in particular from 22 to 35% by weight, of styrene and, respectively, acrylonitrile, and also of from 0 to 5% by weight, preferably from 0 to 4% by weight, in particular from 0 to 3% by weight, of other monomers, where the by weight values are in each case based on the weight, and give a total of 100% by weight.

Polymers A1 to which preference is further given are composed of from 50 to 90% by weight, preferably from 60 to 85% by weight, in particular from 70 to 85% by weight, of styrene and of from 10 to 50% by weight, preferably from 15 to 40% by weight, in particular from 15 to 30% by weight, of methyl methacrylate, and also of from 0 to 5% by weight, preferably from 0 to 4% by weight, in particular from 0 to 3% by weight, of other monomers, where the % by weight values are in each case based on the total weight of A1, and give a total of 100% by weight. Intrinsic viscosity: from 50 to 70 ml/g (IV: measured in 0.5% toluene solution at 20° C.).

Preferred polymers A2 are transparent polymethyl methacrylates, and also polymethyl methacrylates which have a low level of crosslinking, comprising from 5 to 20% by weight of acrylate units, where said units contain hydroxy and/or epoxy groups. Corresponding ethyl acrylates and butyl acrylates are also suitable.

The molding compositions of the invention use a halogen-free polycarbonate as component A3. Examples of suitable halogen-free polycarbonates are those based on diphenols of the general formula (VII):

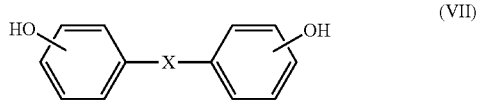

in which X can be a single bond, a $C_1$ to $C_3$-alkylene, a $C_2$- to $C_3$-alkylidene group, a $C_3$- to $C_6$-cycloalkylidene group, or else —S— or —SO$_2$—.

Preferred diphenols of the formula (VII) are for example hydroquinone, resorcinol, 4,4'-dihydroxybiphenyl, 2,2-bis(4-hydroxyphenyl)propane, 2,4-bis(4-hydroxyphenyl)-2-methylbutane, 1,1-bis(4-hydroxyphenyl)cyclohexane. Particular preference is given to 2,2,-bis(4-hydroxyphenyl)propane, and 1,1-bis(4-hydroxy-phenyl)cyclohexane, and also 1,1-bis(4-hydroxyphenyl)-3,3,5-trimethylcyclohexane.

Not only homopolycarbonates but also copolycarbonates are suitable as component A3, and preference is given not only to bisphenol A homopolycarbonate but also to the copolycarbonates of bisphenol A. The suitable polycarbonates can have a linear structure but can also have branching in a known manner, and specifically preferably via incorporation of from 0.05 to 2 mol %, based on the entirety of the diphenols used, of at least one trifunctional compound, for example one having three or more than three phenolic OH groups.

Polycarbonates having relative viscosities $\eta_{rel}$ of from 1.1 to 1.5, in particular from 1.2 to 1.4, have proven to be particularly suitable. This corresponds to average molecular weights Mw (weight average) of from 10 000 to 200 000, preferably from 15 000 to 80 000 and, respectively, intrinsic viscosities from 20 to 100 ml/g, in particular from 40 to 80 ml/g, measured in accordance with the standard DIN 53727 in 0.5% by weight solution in methylene chloride at 23° C. For the purposes of the present invention the expression halogen-free polycarbonates means that the polycarbonates are composed of halogen-free diphenols, halogen-free chain terminators, and optionally halogen-free branching agents, where content of very small ppm quantities (e.g. 5 ppm) of hydrolyzable chlorine resulting by way of example from the production of the polycarbonates with phosgene in the interfacial process is not to be considered for the purposes of the invention as justifying use of the term halogen-containing. For the purposes of the present invention polycarbonates of this type with ppm contents of hydrolyzable chlorine are halogen-free polycarbonates.

The transparent polymers A can be produced by known methods. They can by way of example be produced via free-radical polymerization, or via emulsion polymerization, suspension polymerization, solution polymerization, or bulk polymerization. The polymers can therefore by way of example very generally be produced by a solution polymerization process of the type described by way of example in Kunststoff-Handbuch [Plastics handbook], ed. Vieweg-Daumiller, vol. V (Polystyrene), Carl-Hanser-Verlag, Munich, 1969, p. 124.

The molding compositions of the invention can be produced from components A, B, and C, and also optionally D, in any desired manner by any of the known methods. However, it is preferable to blend components A, B, and C, and also optionally D, via mixing in the melt, for example by using the components together in an extrusion process (ZSK 30 twin-screw extruder from Werner & Pfleiderer), or in a kneading or rolling process, e.g. at temperatures in the range from 160 to 300° C., preferably from 180 to 280° C.

Re: Component B

A long lasting deep-black color can be provided to transparent thermoplastic copolymers, for example SAN, AMSAN, and mixtures of these, by using a combination of dyes (component C) and small quantities of carbon black (component B).

The range of concentrate of carbon black pigment preferred for transparent materials is from 0.01 to 5% by weight, in particular from 0.05 to 3% by weight. Carbon blacks that can in particular be used are those with primary particle sizes from 5 nm to 100 nm. However, preference is given to primary particle sizes of from 7 to 60 nm, in particular from 7 to 40 nm. Commercially available Pigment Black 7 is often used. Deep-black molding compositions can be obtained even with from 0.01 to 0.4% by weight of component B.

The penetration depths of the color-polymer combinations with component B in the abovementioned concentration ranges are often in the range below 40 µm. Penetration depth is defined as that depth below the surface at which the intensity of the penetrating light has fallen to about 1/e corresponding to about 37%. The penetration depth for a given color formulation can be calculated by using the known Kubelka-Munk formula.

Re: Component C

The total quantity of the dyes used is usually from 0.1 to 1.5% by weight, but can also in some cases be from 0.5 to 3.5% by weight. Smaller quantities, starting at 0.05% of each dye, can also be sufficient to give deep-black colorings in the case of highly transparent materials and small layer thicknesses, e.g. more than 2 mm.

The perceived color of the thermoplastic molding compositions colored by this method is very deep black with L*-values of from 0.5 to 2.0, measured in accordance with DIN 5033. Measurement method: diffuse/8 degrees, excluding gloss—with a very high gloss level of more than 98 at measurement angles 20/60/85 degrees.

In the invention it is possible to avoid goniochromism in the molding compositions; goniochromism causes differences in color and lightness when injection moldings are observed at different angles.

The penetration depths of the color-polymer combinations with component C in the abovementioned concentration ranges are often in the range starting at 150 µm.

Additive Components D:

The molding compositions of the invention can comprise, alongside components A, B, and C, one or more additional substances or additives which differ from components A, B, and C and which are typical and familiar for plastic mixtures. The compositions comprise from 0 to 5% by weight, in particular from 0.1 to 5% by weight, of component D.

Examples that may be mentioned of these additional substances or additives are: antistatic agents, antioxidants, stabilizers for improving thermal stability, for increasing resistance to light, and for increasing hydrolysis resistance and chemicals resistance, agents to counteract decomposition by heat, and in particular the lubricants advantageous for the production of moldings.

These other additional substances can be added at any stage of the production process, but preferably at an early juncture in order to make early use of the stabilizing effects (or other specific effects) of the additional substance. Heat stabilizers and oxidation retarders are usually metal halides (chlorides, bromides, iodides) deriving from metals of group I of the Periodic Table of the Elements (for example Li, Na, K, Cu).

Stabilizers suitable as component D are the usual hindered phenols, and also vitamin E and compounds of analogous structure. Benzophenones, resorcinols, salicylates, benzotriazoles, and other compounds are also suitable. Quantities of these usually used are from 0 to 2% by weight, preferably from 0.01 to 2% by weight (based on the total weight of the molding compositions of the invention).

Suitable lubricants and mold-release agents are stearic acids, stearyl alcohols, stearic esters, and in general terms higher fatty acids, derivatives thereof, and corresponding fatty acid mixtures having from 12 to 30 carbon atoms. The quantities of these additions are—insofar as they are present—in the range from 0.05 to 1% by weight (based on the total weight of the molding compositions of the invention).

Other additional substances that can be used are silicone oils, oligomeric isobutylene, and similar substances, and the usual quantities, insofar as these are present, are from 0.05 to 5% by weight (based on the total weight of the molding compositions of the invention). It is likewise possible in principle to use pigments, dyes, optical brighteners, such as ultramarine blue, phthalocyanines, titanium dioxide, cadmium sulfides, and derivatives of perylenetetracarboxylic acid. However, these have to be appropriate for component C, and they are generally not used.

Quantities usually used of processing aids and stabilizers, lubricants, and antistatic agents are from 0 to 2% by weight, preferably from 0.01 to 2% by weight (based on the total weight of the molding compositions of the invention).

The molding compositions of the invention can be produced from the components in any desired manner by any of the known methods. However, it is preferable to blend the components via mixing in the melt, for example by using the components together in an extrusion process, or in a kneading or rolling process, e.g. at temperatures in the range from 160 to 400° C., preferably from 180 to 280° C.; in one preferred embodiment the components here have been isolated to some extent or entirely in advance from the reaction mixtures obtained during the respective steps of production.

The molding compositions of the invention can be processed by injection molding or, for example, processed to give foils or moldings. These foils, injection moldings, or other moldings are in particular suitable for the use in the automobile exterior region, i.e. with exposure to weathering.

The examples and claims below provide further explanation of the invention.

EXAMPLE 1

Deep-black thermoplastic molding compositions based on SAN copolymers and on AMSAN copolymers are produced and studied.

Use (of a total) of 1.1% by weight of component C and addition of a quantity of 0.1% by weight of component B (Pigment Black 7) gave a deep-black thermoplastic molding composition (based on SAN and, respectively, AMSAN (Luran® HH-120)). The resultant injection moldings exhibit little goniochromism. The calculated penetration depth is 60 μm. The primary particle diameter of the carbon black component B (pigment black) used was about 25 nm.

The transparent polymers A used (with maximal haze of 25% at 2 mm in accordance with ISO 14782) were colored with (as component C) a combination of 2 or 3 dyes which are soluble in the polymer and in combination produce a black color. The total quantity used of the dyes was from 0.05% to 3.5%, preferably from 0.2% to 2.5%, in particular from 0.35% to 1.6%.

A quantity of from 0.01% to 3%, preferably from 0.02% to 0.8%, in particular from 0.03% to 0.4%, of carbon black (Pigment Black 7) was tested as component B in the production of the molding compositions. The intended primary particle diameter of the pigment black is from 5 to 30 nm.

When molding compositions that could be produced by simple mixing of the components were extruded and then square test samples of thickness 2 mm were produced, the perceived color of these was very deep black, and they had very high gloss. The molding compositions could also be processed easily by injection molding, and exhibited very little goniochromism. The penetration depth of the colorant combinations used was in the range from 50 to 90 μm. This small penetration depth also reduced goniochromism.

The resultant moldings or injection moldings also had high weathering resistance, for example at temperatures above 30° C.

TABLE 1

| Polymer | Pigmentation | Lightness L* excl. gloss | 20 degree gloss value | Assessment | Goniochromism |
| --- | --- | --- | --- | --- | --- |
| SAN | 0.5% of carbon black | 6.0 | 99 | moderate black, high gloss | very slight |
| SAN | 1.5% of carbon black | 3.5 | 91 | dark black, low gloss | very slight |
| SAN | 0.5% of dyes | 0.5 | 100 | dark deep black, very high gloss | very high!! |
| SAN | 1.1% of dyes C, 0.1% carbon black | 1.1 | 100 | dark deep black, very high gloss | slight |
| ABS. for comparison | 1.5% carbon black | 7.2 | 94 | moderate black, low gloss | high |

Component C used comprised a combination of the three following dyes:
Solvent Violet 13
Solvent Yellow 93 and
Solvent Violet 59
in a ratio by weight of 7:2:1.

Other SAN colorings are tested with the following combinations of component C; various quantitative proportions can be used here:
a) Solvent Blue 97
   Solvent Violet 59 and
   Solvent Red 135
b) Solvent Red 135
   Solvent Blue 97 and
   Solvent Violet 59
c) Solvent Red 135 and
   Solvent Blue 97.

The combination of B and C is used for deep-black coloring not only of the SAN mentioned (Luran®, Styrolution) but also of Luran® HH-120; (AMSAN, Styrolution), Plexiglas® 8N (Evonik Industries), and Makrolon® (Bayer AG).

What is claimed is:

1. A black thermoplastic molding composition with high gloss, consisting of:
   A) from 90 to 99.5% by weight of one or more styrene copolymers as component A1,
   B) from 0.01 to 5% by weight of a carbon black pigment as component B,
   C) as component C, from 0.5 to 1.2% by weight of at least three dyes soluble in the molding composition,
   D) as component D, from 0 to 5% by weight of one or more additional substances different from components B and C,
   where component A is a copolymer selected from the group consisting of acrylonitrile, styrene, and/or α-methylstyrene, phenylmaleimide, maleic anhydride, methyl methacrylate, and a mixture of these,
   where the ratio by weight of component B used to component C used is from 3:1 to 1:15,
   where the at least three dyes cover complementary color regions such that the combination produces a black color,
   where the thermoplastic molding compositions have a deep-black color with $L^*$-values from 0.5 to 2.0, measured in accordance with DIN 5033:2009, and a high gloss of more than 98, measured in accordance with DIN 67530:1982, and
   where each of the percentages by weight is based on the total weight of components A to D, and these give a total of 100 percent by weight.

2. The thermoplastic molding composition as claimed in claim 1, characterized in that the molding composition consists of, as component B, from 0.01 to 5% by weight of a carbon black pigment which has an average primary particle size in the range from 5 to 100 nm.

3. The thermoplastic molding composition as claimed in claim 1, characterized in that component A is a copolymer of acrylonitrile, styrene, and/or α-methylstyrene, and the proportion by weight of acrylonitrile, based on component A, is from 19 to 39% by weight.

4. The thermoplastic molding composition as claimed in claim 1, characterized in that component A is a styrene/acrylonitrile copolymer or an α-methylstyrene/acrylonitrile copolymer.

5. The thermoplastic molding composition as claimed in claim 1, characterized in that component A is a transparent styrene/acrylonitrile copolymer or a transparent α-methylstyrene/acrylonitrile copolymer with a melt volume rate, MVR, 220/3.8, of from 4 to 22 $cm^3/10$ min.

6. The thermoplastic molding composition as claimed in claim 1, characterized in that component A is a styrene/methyl methacrylate copolymer, where the proportion by weight of MMA, based on component A, is from 19 to 31% by weight.

7. The thermoplastic molding composition as claimed in claim 1, characterized in that the proportion by weight of B is from 0.05 to 3% by weight.

8. A method of producing a molded object with a deep-black surface and high gloss comprising the step of molding the thermoplastic molding compositions as claimed in claim 1 wherein the molded object is an object for use in a motor vehicle, a household appliance, electrical equipment, a decorative strips, or outdoor cladding.

9. A method as claimed in claim 8 wherein the molded object is an object for use in the exterior region of a motor vehicle selected from A-, B-, C-, or D-pillar cladding, a spoiler, a window frame, a cover strip, a hood, a panel, a part of a radiator grille, antenna cladding, of the side mirror, or a part of a front or rear lamp.

10. A process as claimed in claim 1, characterized in that components A, B, and C, and also optionally D, are mixed with one another.

11. The thermoplastic molding composition as claimed in claim 2, characterized in that the molding composition consists of, as component B, from 0.01 to 5% by weight of a carbon black pigment which has an average primary particle size in the range from 7 to 60 nm.

* * * * *